(12) United States Patent
Tang et al.

(10) Patent No.: US 10,212,303 B2
(45) Date of Patent: Feb. 19, 2019

(54) SCANNER

(71) Applicant: HEWLETT-PACKARD DEVELOPMENT COMPANY, L.P., Houston, TX (US)

(72) Inventors: Song-Bo Tang, Shanghai (CN); Fei Guo, Shanghai (CN); Ai-Qiang Yang, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/547,800

(22) PCT Filed: Apr. 17, 2015

(86) PCT No.: PCT/CN2015/076883
§ 371 (c)(1),
(2) Date: Jul. 31, 2017

(87) PCT Pub. No.: WO2016/165129
PCT Pub. Date: Oct. 20, 2016

(65) Prior Publication Data
US 2018/0027142 A1    Jan. 25, 2018

(51) Int. Cl.
*H04N 1/04* (2006.01)
*H04N 1/028* (2006.01)

(52) U.S. Cl.
CPC .......... *H04N 1/02845* (2013.01); *H04N 1/04* (2013.01)

(58) Field of Classification Search
CPC .......... F21V 3/02; F21V 13/04; F21V 23/005; F21V 23/006; F21V 5/02; F21V 7/0008;
(Continued)

(56) References Cited

U.S. PATENT DOCUMENTS 6,661,545 B2 * 12/2003 Sato ................... H04N 1/40056
358/505
6,784,410 B2 * 8/2004 Ishizuka ............ H04N 1/00127
250/205
(Continued)

FOREIGN PATENT DOCUMENTS

CN        104335566       4/2015
JP        2003152960      5/2003

OTHER PUBLICATIONS

Webb, et al., "Design of A 600 Pixel Per Inch, 30-bit Color Scanner", Article 8, Hewlett-Packard Journal, Feb. 1997, 10 pages.

*Primary Examiner* — Negussie Worku
(74) *Attorney, Agent, or Firm* — HP Inc. Patent Department

(57) ABSTRACT

A scanner is disclosed. The scanner includes a light source to emit light of a first color during a first turn-on period and emit light of a second color during a second turn-on period; a sensor to receive light from a scanning area, in response to the light of the first color directed to the scanning area, during a first sensing period, and receive light from the scanning area, in response to the light of the second color directed to the scanning area, during a second sensing period; and a controller to control the timing of the first turn-on period within the first sensing period and the second turn-on period within the second sensing period.

16 Claims, 7 Drawing Sheets

(58) Field of Classification Search
CPC ... F21V 7/005; F21V 9/16; F21V 9/30; F21Y
2115/10; F21Y 2103/10; G06F 3/0412;
G06F 1/3215; G06F 1/3259; G06F
2203/04101; G06F 2203/04108; G06F
3/0418; G06F 3/042; G06F 3/0425
See application file for complete search history.

(56) References Cited

U.S. PATENT DOCUMENTS

| | | | |
|---|---|---|---|
| 7,460,284 B2 | 12/2008 | Hiromatsu | |
| 7,658,462 B2 | 2/2010 | Eom | |
| 7,916,161 B2 | 3/2011 | Kusunose et al. | |
| 8,059,315 B2* | 11/2011 | Endo | G07D 7/121 |
| | | | 358/474 |
| 8,576,461 B2* | 11/2013 | Nagasaka | H04N 1/203 |
| | | | 358/474 |
| 8,698,884 B2* | 4/2014 | Godo | A61B 1/0684 |
| | | | 348/65 |
| 9,374,491 B2* | 6/2016 | Chubachi | H04N 1/02815 |
| 9,599,884 B2* | 3/2017 | Fukami | G03B 21/2053 |
| 9,785,085 B2* | 10/2017 | Sakamoto | G03G 15/043 |
| 2006/0114521 A1 | 6/2006 | Bailey et al. | |
| 2006/0274171 A1* | 12/2006 | Wang | G06K 7/14 |
| | | | 348/294 |
| 2008/0136334 A1* | 6/2008 | Robinson | H05B 37/0254 |
| | | | 315/151 |
| 2009/0147337 A1 | 6/2009 | Wang | |
| 2009/0219584 A1 | 9/2009 | Ingendoh | |
| 2011/0134446 A1* | 6/2011 | Lee | H04N 1/40056 |
| | | | 358/1.6 |
| 2011/0149306 A1* | 6/2011 | Kim | H04N 1/02815 |
| | | | 358/1.6 |
| 2012/0140985 A1* | 6/2012 | Hattori | H04N 5/147 |
| | | | 382/103 |
| 2012/0250115 A1* | 10/2012 | Umeno | H04N 1/00663 |
| | | | 358/498 |
| 2013/0044338 A1* | 2/2013 | Nikaku | H04N 1/00013 |
| | | | 358/1.13 |
| 2013/0070316 A1* | 3/2013 | Ohara | H04N 1/00997 |
| | | | 358/475 |
| 2017/0003168 A1* | 1/2017 | Fujii | A61B 5/0075 |
| 2017/0230638 A1* | 8/2017 | Wajs | H04N 13/218 |
| 2017/0354392 A1* | 12/2017 | Fengler | A61B 6/481 |

* cited by examiner

ASIC a circuit to, in response to a signal to indicate a start of a first exposure period, trigger emission of a first light of a first color at a delayed time in the first exposure period a circuit to, in response to a signal to indicate a start of a second exposure period, trigger emission of a second light of a second color at a delayed time in the second exposure period a circuit to, in response to a signal to indicate a start of a third exposure period, trigger emission of a third light of a third color without delay

FIG. 6

SCANNER

BACKGROUND

A scanner is a device used to create a digital image from a printed page or from a 3-dimensional object placed on a scanning bed. There are many types of scanners, for example sheet feed scanners, flatbed scanners with/without automatic document feeder (ADF), stand-alone scanners and scanner integrated into multifunctional printers.

A scanner generally irradiates light onto document by using a light source and performs photoelectric transformation of reflected light from the irradiated light using an image sensor to generate image data. An example of the image sensor may be a contact image sensor (CIS). The CIS includes a light source which generates red, green and blue light for illuminating the document, a rod lens array and a sensor array which senses the reflected light from the document.

BRIEF DESCRIPTION OF THE DRAWINGS

FIG. 6 shows a structure of an ASIC for controlling scanning according to an example;

DETAILED DESCRIPTION

A scanner is used to create digital images of documents or objects placed on the scanner. A color scanner captures color images from the scanned objects. To describe the color of an object typically requires three different color values or components. The color components may be red, green and blue (RGB). A color scanner captures the red, green and blue values for each small area in the object being scanned. These small areas are typically called pixels. The color components are not limited to red, green and blue, and the number of color components is not limited. For example, orange, yellow and violet light may be used in addition to or instead of red, green and blue light. Other number and types of colors may be possible.

Figure 1:
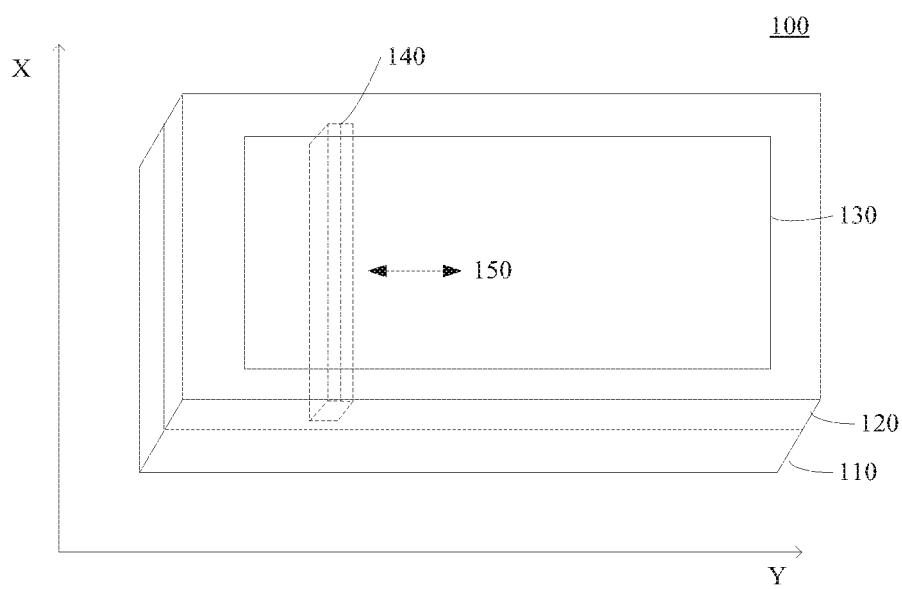
FIG. 1 shows an isometric view of a flatbed scanner according to an example.

FIG. 1 is an isometric view of a flatbed scanner 100 according to an example. Flatbed scanner 100 comprises, without limitation, a scanner base 110, a top bezel 120, a scan platen 130 and a scan head 140. Scanner base 110 supports the scan platen 130 around its edges. Top bezel 120 fits the scan platen 130 and attaches to the scanner base 110 thereby holding the scan platen 130 in place. The scan platen 130 is fabricated from a transparent material such as glass. The top surface of the scan platen 130 forms a flatbed scan area. Scanner base 110 also supports a drive system (not shown in FIG. 1 for clarity) that moves the scan head 140 along the underside of the scan platen 130, as shown by arrow 150 and Y direction of the coordinates.

Figure 3:
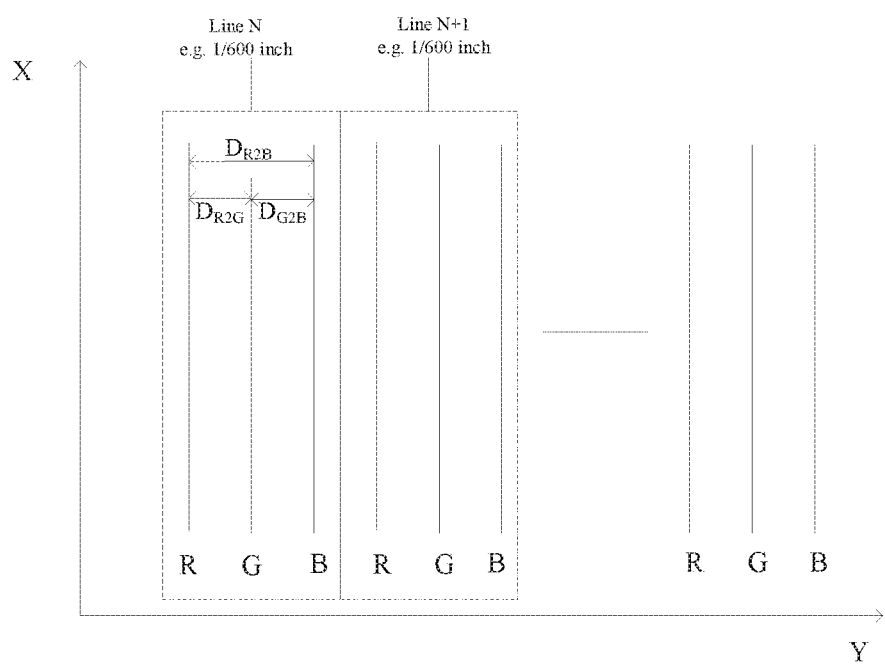
FIG. 3 shows scan lines according to an example.

While moving along the Y direction, the scan head 140 may scan lines of an object as shown in FIG. 3 and generate data representing the scanned lines. The data may subsequently be used to create an image of the object being scanned. In the example as shown in FIG. 3, the scan head may move at a constant speed and repeatedly take three exposures in sequence using three different colors of light. For example, a red light is used for the first exposure, a green light is used for the second exposure, and a blue light is used for the third exposure. Each set of three exposures is used to create a scan line, which is illustrated as Line N or Line N+1 in FIG. 3. All the scan lines of an object may be used to create the image of the object.

Figure 2:
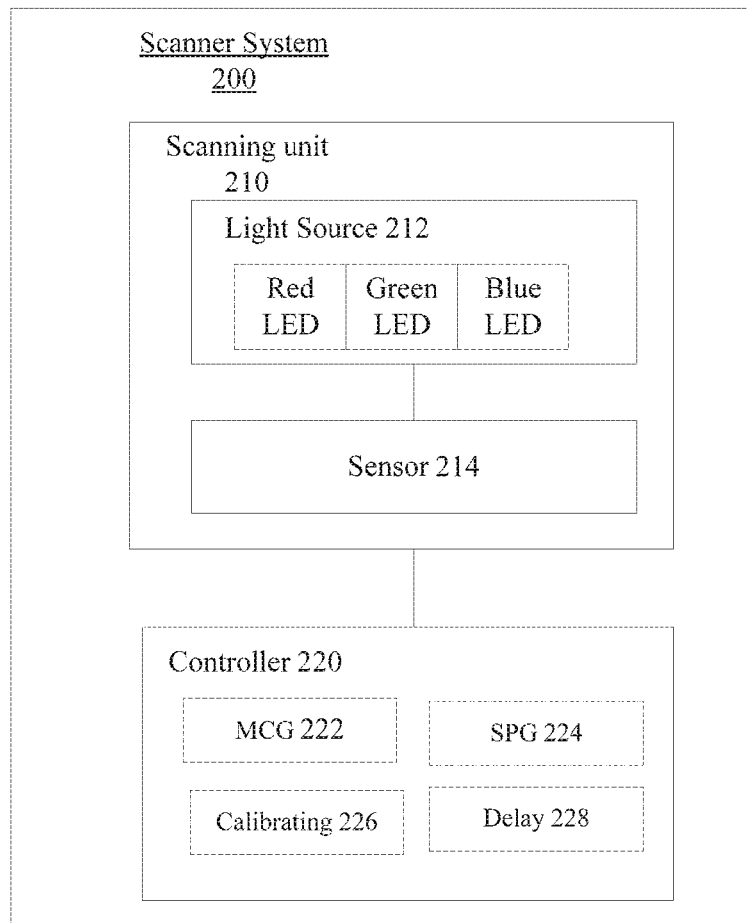
FIG. 2 shows a structure of a scanner system according to an example.

FIG. 2 shows a structure of a scanner system 200 according to an example. The scanner system 200 includes, without limitation, a scanning unit 210 and a controller 220. The scanning unit 210 may be a part of the scan head 140. The scanning unit 210 includes a light source 212 and a sensor 214, which operate under the control of the controller 220. The light source 212 may generate light of a color during a turn-on period and direct the light to a scanning area such as Line N or Line N+1 as shown in FIG. 3. A plurality of turn-on periods may occur, and light of a different color may be generated in each of the periods. The turn-on periods are controlled or activated by the controller 220.

As shown in FIG. 2, an example light source 212 may include, without limitation, three light emitting diode (LED) units, such as red, green and blue LED units, as shown in the dotted blocks. The number of the light emitting units is not limited, for example, there may be two light emitting units or may be more than three light emitting units. The colors of the generated light are not limited to red, green and blue, for example, orange, yellow and violet light may be employed in addition to or instead of red, green and blue light. Other colors are also possible. Each of the LED units may produce a color light to scan a line of the object. The light source may include a light guide element (not shown in the FIG. 2 for clarity) which directs the light to the scanning area. The sensor 214 may receive light in response to the light directed to the scanning area during a sensing period as shown in FIGS. 4A-5B. A plurality of sensing periods may occur, and the light may be sensed in each of the periods. The controller 220 controls the timing of the plurality of turn-on periods within the plurality of sensing periods.

FIG. 3 illustrates scan lines according to an example. As shown in FIG. 3, lines of an object may be scanned at a resolution such as 600 pixels per inch (PPI). Line N or N+1 is any one of the lines along the X direction being scanned. As shown in FIG. 1, while the scanner header 140 is moving, the red light, green light and blue light are emitted one by one to the scanning area to form the red, green and blue lines of Line N. $D_{R2G}$, $D_{G2B}$ and $D_{R2B}$ illustrate the distances among the red, green and blue lines of Line N.

Figure 4A:
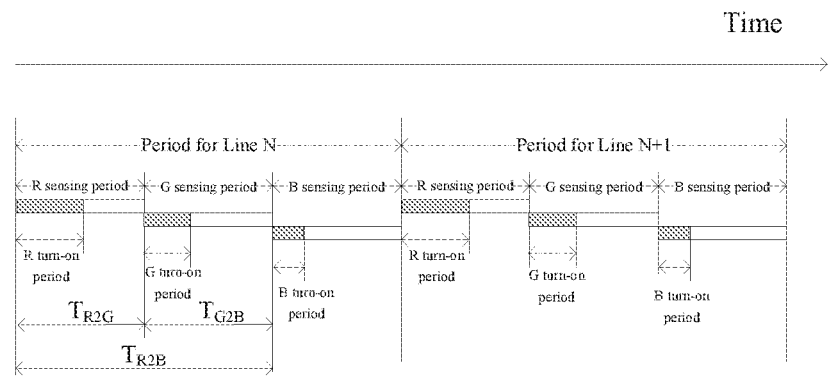
FIGS. 4A and 4B show the timing of operation of a light source and a sensor according to an example.
Figure 4B:
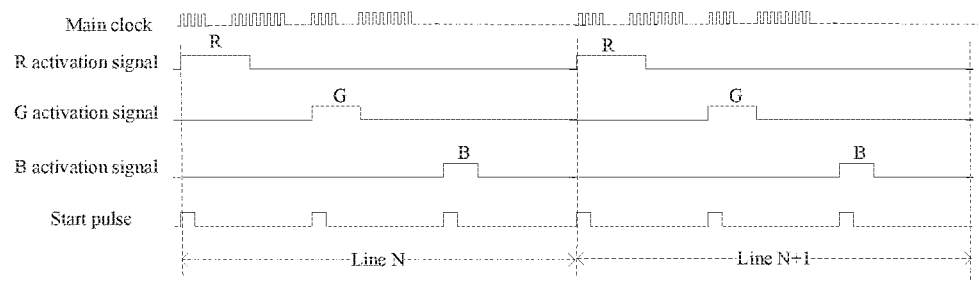

FIGS. 4A and 4B show the timing of operation of the light source and the sensor under the control of the controller according to an example. As shown in FIG. 4A, one period for scanning a line is divided into three sensing periods, in each of which the sensor 214 is reset to sense each of the red light, green light and blue light from the scanning area. Each sensing period is triggered by a start pulse shown in FIG. 4B. The red, green and blue activation signals are triggered by the start pulses. The red activation signal triggers the red LED to produce red light. The green activation signal triggers the green LED to produce green light. The blue activation signal triggers the blue LED to produce blue light. The red, green and blue activation signals decide the turn-on periods for emitting the red, green and blue lights. The produced red light, green light and blue light are directed to the scanning area via for example a lens unit, where the scanning area is the Line N or Line N+1 as shown in FIG.

3. In response to each of the red light, green light and blue light directed to the scanning area, the sensor 214 receives light from the scanning area. During such a three-pass, three-exposure procedure for the red, green and blue lines, data sensed by the sensor 214 may be used to form a scan line N, as illustrated in FIG. 3.

In such an example, the red, green and blue turn-on periods start substantially concurrently with the red, green and blue sensing periods respectively. The multiple sensing periods for different colors of light, such as the red, green and blue sensing periods in this example, are equal, that is, the start pulses occur at a fixed frequency and thus are evenly distributed in time. The frequency of a main clock may be fixed. Such a configuration may be helpful to simplify the timing control for the scanning. The even distribution of the exposures of the color lines may be helpful to improve image quality. In some examples, the sensing periods for different colors may also be unequal or different from each other.

The period for scanning a Line N may be determined based on some factors, such as scanning speed, scanning resolution, the size of the scan area or the scan platen and so on. For example, the number of pages that can be scanned per minute and the size of the scan area, such as that fitting A4 or A3 pages, are two parameters which may be desired for users. The relative moving speed between an object such as a page to be scanned and the sensing unit of the scanner may be determined from the two parameters. Then for a certain scanning resolution, for example 600 PPI, the period for scanning a line may be determined by diving 1/600 inch with the relative moving speed. After the period for scanning a line is determined, a suitable main clock may be chosen. The controller 220 may generate the main clock which may be fixed according to the example.

Figure 5A:
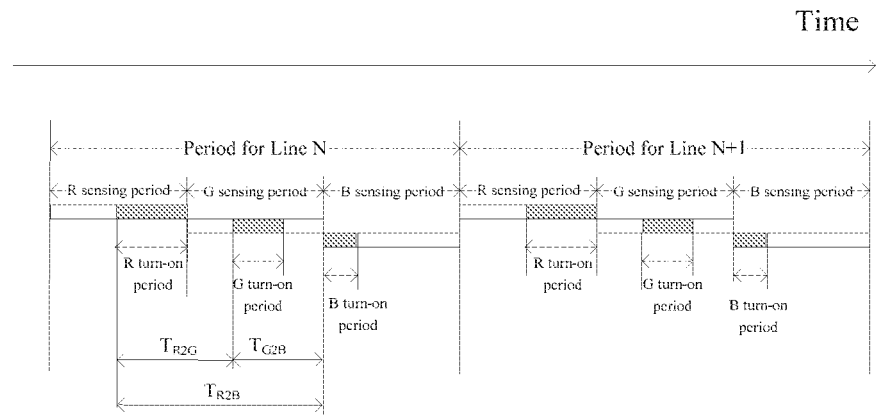
FIGS. 5A and 5B show the timing of operation of a light source and a sensor according to an example.
Figure 5B:
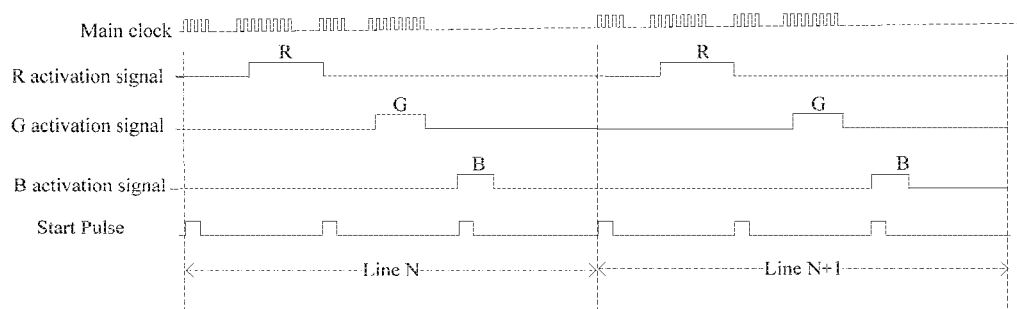

FIGS. 5A and 5B show the timing of the operation of the light source and the sensor under the control of the controller according to an example.

As shown in FIG. 5A, at least one of the red, green and blue turn-on periods is delayed relative to the beginning of the corresponding sensing periods. The delayed turn-on period is still within the corresponding sensing period in order to avoid potential overlap of two different colors of light during scanning. The delaying of the LED turn-on periods may reduce Color Registration (CR) error in Y direction of the scanner.

CR error is misalignment among the scanner's red, green and blue channels. Referring to FIG. 3, $D_{R2G}$, $D_{G2B}$ and $D_{R2B}$ illustrate the distances among the red, green and blue lines of Line N. The red, green and blue lines are positions at which the red light, green light and blue light are respectively directed while the scanner head is moving. The values of $D_{R2G}$, $D_{G2B}$ and $D_{R2B}$ may be used to determine the amount of CR error of the scanned image. The CR error may cause color fringing especially at the edges and blur the edges.

Referring to FIGS. 4A and 5A. $T_{R2G}$, $T_{G2B}$ and $T_{R2B}$ illustrate the time differences among the emitting times of the red, green and blue LEDs for Line N while the scanner head is moving. The values of $D_{R2G}$, $D_{G2B}$ and $D_{R2B}$ are proportionate to the values of $T_{R2G}$, $T_{G2B}$ and $T_{R2B}$. By delaying the activation of at least one of the multiple LEDs in the example of FIG. 5A, the CR error may be alleviated along with the reduction of the time differences among the light emitting of the LEDs.

As shown in FIGS. 3, 4A, and 5A, the worst CR error is decided by the distance between the first color line and the last color line of the scan Line N, and accordingly by the time difference between the turn-on times of the first color light and the last color light. Therefore reducing the distance between the first color line and the last color line may provide significant improvement for the CR error. To this end, the first red turn-on period may be delayed within the first red sensing period. For example, the red turn-on period may be delayed to a position substantially at the end of the first red sensing period as shown in FIGS. 5A and 5B.

Along with the delaying of the first red turn-on period, the second green turn-on period may be delayed. For example, the second green turn-on period may be delayed to a position substantially at the center of the second green sensing period as shown in FIGS. 5A and 5B. In this way, the delayed red, green and blue turn-on periods are evenly distributed and may be helpful for the quality of the scanned image and for avoiding potential color overlap. The positions of the delayed turn-on periods are not limited to the specific positions as shown in FIG. 5A, other positions are applicable.

As shown in FIG. 5B, once each of the start pulses for resetting the sensor occurs, the corresponding red, green or blue activation signal may be delayed so as to activate the corresponding LED at a delayed time. For example, the first red activation signal may be delayed in response to the corresponding start pulse by a time period indicated as: the duration between the corresponding start pulse and the next start pulse—the duration of the red turn-on period. The second green activation signal may be delayed in response to the corresponding start pulse by a time period indicated as: (the duration between the corresponding start pulse and the next start pulse—the duration of the green turn-on period)/2.

Referring back to FIG. 2, the controller 220 may include, without limitation, a master clock generator (MCG) 222 that generates a master clock, a start pulse generator (SPG) 224 that generates start pulses for triggering resetting of the sensor 214, a calibrating module 226 that calibrates turn-on periods of the LED units, and a delay module 228 that delays activation signals for some of the LED units relative to the start pulses, as shown in the dotted blocks.

Although the master clock generator 222, the start pulse generator 224, the calibrating module 226 and the delay module 228 are shown being internal to the controller 220, some of them can also be individual circuits that are external to the controller 220 and are configured to communicate with the controller 220 via buses.

Although the controller 220 is shown as including respective modules 222 to 228, the controller 220 may be implemented as a whole to perform the various functions described herein without needing to physically or separately include such respective modules.

Although the light source 212 of the scanner 200 in FIG. 2 may generate red, green and blue light, the number and the sequence of the colors of light are not limited. In an example, the light source 212 may emit light of a first color during a first turn-on period and emit light of a second color during a second turn-on period. The sensor 214 may receive light from a scanning area, in response to the light of the first color directed to the scanning area, during a first sensing period, and receive light from the scanning area, in response to the light of the second color directed to the scanning area, during a second sensing period. The controller 220 may control the timing of the first turn-on period within the first sensing period and the second turn-on period within the second sensing period. For example, the controller 220 may delay the first turn-on period relative to the beginning of the first sensing period while ensuring that the delayed first turn-on period is still within the first sensing period.

In addition, the light source may emit light of a third color during a third turn-on period. The sensor may receive light from the scanning area, in response to the light of the third color directed to the scanning area, during a third sensing period. The controller 220 may delay the second turn-on period relative to the beginning of the second sensing period while ensuring that the delayed second turn-on period is within the second sensing period. The controller 220 may delay the first turn-on period to a position substantially at the end of the first sensing period. The controller 220 may delay the second turn-on period to a position substantially at the center of the second sensing period. The controller 220 may start the third turn-on period substantially at the beginning of the third sensing period.

The controller 220 may execute a calibration process to determine turn-on periods such as the first, second and third turn-on periods. The calibration process may be executed at any suitable time, for example, at the time of manufacture, each time the scanner is powered up, each time a new scan task takes place, and so on.

The sensing periods may be fixed time periods which are determined based on at least one of a scanning resolution, a scanning speed, and a size of a scan area. The sensing periods may be counted with a fixed main clock. The controller 220 may delay the turn-on periods by counting with the fixed main clock.

The controller 220 can be a general-purpose microcontroller, a general-purpose microprocessor, a dedicated microprocessor or controller, a signal processor, an application-specific-integrated circuit (ASIC), or the like. In some examples, the controller 220 and its functions described herein are implemented in a combination of at least one of firmware, software, hardware, and the like. In an example, the controller 220 may be implemented as an ASIC, where each functional module in the ASIC may be implemented or understood as a circuit.

FIG. 6 shows a structure of the controller implemented as an ASIC according to an example. The ASIC may comprise a circuit to, in response to a signal to indicate a start of a first exposure period, trigger emission of a first light of a first color at a delayed time in the first exposure period. The ASIC may comprise a circuit to, in response to a signal to indicate a start of a second exposure period, trigger emission of a second light of a second color at a delayed time in the second exposure period. The ASIC may comprise a circuit to, in response to a signal to indicate a start of a third exposure period, trigger emission of a third light of a third color without delay. The emission of the first light may be delayed to occur during a period which is substantially at the end of the first exposure period. The emission of the second light may be delayed to occur during a period which is substantially in the middle of the second exposure period. The first light, second light and third light may be red light, green light and blue light, and the signals indicating the start of the first, second and third exposure periods may be the start pulses as shown in FIG. 5B. Each exposure period or sensing period may be defined by the duration of two consecutive start pulses.

It should be understood that the ASIC may include other circuits for implementing the operations of the controller 220 described herein.

Figure 7:
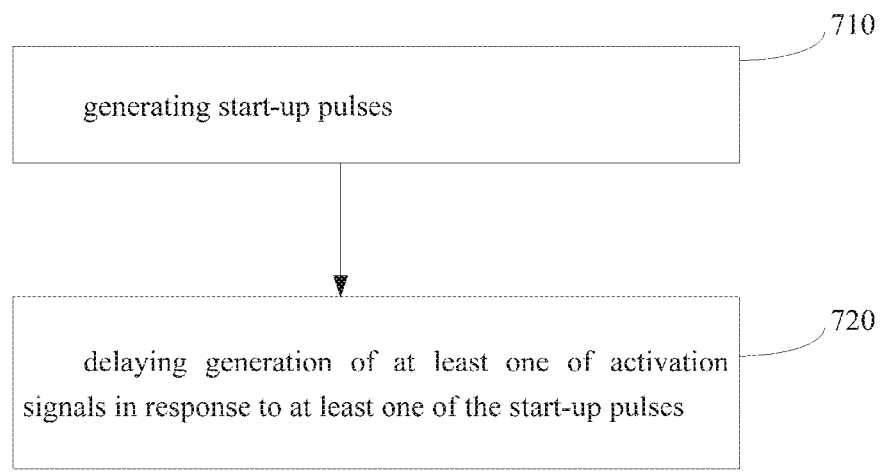
FIG. 7 shows a method for scanning according to an example.

FIG. 7 shows a method for scanning according to an example. At 710, start-up pulses may be generated. The star-up pulses are used to trigger sensing of light. The star-up pulses may be evenly distributed in time. At 720, at least one of activation signals may be delayed to generate in response to at least one of the start-up pulses. The activation signals are used to activate emission of light of different colors to a scanning area.

For example, in the 710, the generation of a first one of the activation signals may be delayed in response to a first one of the start-up pulses. The first activation signal is used to activate emission of light of a first one of the different colors to the scanning area. More specifically, the generation of the first activation signal may be delayed by a time period indicated as: a duration between the first and a second consecutive ones of the start-up pulses—a duration of the first activation signal. The generation of a second one of the activation signals may be delayed in response to the second start-up pulse. The second activation signal is used to activate emission of light of a second one of the different colors to the scanning area. More specifically, the generation of the second activation signal may be delayed by a time period indicated as: (a duration between the second and a third consecutive ones of the start-up pulses—a duration of the second activation signal)/2. A third one of the activation signals may be generated in response to a third one of the start-up pulses without delay.

The foregoing disclosure describes a number of examples for implementing scanning in a scanner. It should be appreciated the described examples intend to illustrate rather than limit the invention. Thus the claims are not intended to be limited to the illustrated details of the examples, but are to be accorded the full scope consistent with the language of the claims.

The invention claimed is:

1. A scanner, comprising
    a light source to emit light of a first color during a first turn-on period and emit light of a second color during a second turn-on period;
    a sensor to receive light from a scanning area, in response to the light of the first color directed to the scanning area, during a first sensing period, and receive light from the scanning area, in response to the light of the second color directed to the scanning area, during a second sensing period; and
    a controller, coupled to the light source and the sensor, to control the timing of the first turn-on period within the first sensing period and the second turn-on period within the second sensing period wherein a turn-on period of each color is delayed relative to a sensing period of each color.

2. The scanner of claim 1, wherein the delayed first turn-on period is within the first sensing period.

3. The scanner of claim 2, wherein the light source emits light of a third color during a third turn-on period,
    wherein the sensor receives light from the scanning area, in response to the light of the third color directed to the scanning area, during a third sensing period,
    wherein the controller delays the second turn-on period relative to the beginning of the second sensing period, and wherein the delayed second turn-on period is within the second sensing period.

4. The scanner of claim 3, wherein the controller delays the first turn-on period to a position substantially at the end of the first sensing period.

5. The scanner of claim 4, wherein the controller delays the second turn-on period to a position substantially at the center of the second sensing period.

6. The scanner of claim 5, wherein the controller starts the third turn-on period at the beginning of the third sensing period.

7. The scanner of claim 3, wherein the controller delays the first and the second turn-on periods by counting with a fixed main clock.

8. The scanner of claim 3, wherein the controller executes a calibration process to determine the first, the second and the third turn-on periods.

9. The scanner of claim 3, wherein the first, the second and the third sensing periods are fixed time periods which are determined based on at least one of a scanning resolution, a scanning speed, and a size of a scan area.

10. The scanner of claim 1, wherein the first and second sensing period occurs at a fixed frequency.

11. A method for scanning in a scanner, comprising:
generating start-up pulses which are evenly distributed in time; and
delaying generation of at least one of activation signals in response to at least one of the start-up pulses, wherein the activation signals activates emission of light of different colors to a scanning area; and
delaying a turn-on period for each color relative to a sensing period of each color.

12. The method of claim 11, wherein the delaying comprising:
delaying generation of a first one of the activation signals in response to a first one of the start-up pulses, wherein the first activation signal activates emission of light of a first one of the different colors to the scanning area.

13. The method of claim 12, wherein the delaying comprising:
delaying generation of the first activation signal by a time period indicated as: a duration between the first and a second consecutive ones of the start-up pulses a duration of the first activation signal.

14. The method of claim 13, wherein the delaying comprising:
delaying generation of a second one of the activation signals in response to the second start-up pulse, by a time period indicated as: (a duration between the second and a third consecutive ones of the start-up pulses–a duration of the second activation signal)/2, wherein the second activation signal activates emission of light of a second one of the different colors to the scanning area.

15. An Application Specific Integrated Circuit (ASIC) which controls scanning, comprising:
a circuit to, in response to a signal to indicate a start of a first exposure period, trigger emission of a first light of a first color at a delayed time in the first exposure period;
a circuit to, in response to a signal to indicate a start of a second exposure period, trigger emission of a second light of a second color at a delayed time in the second exposure period; and
a circuit to, in response to a signal to indicate a start of a third exposure period, trigger emission of a third light of a third color without delay; and
a circuit to, in response to a signal to indicate the start of an exposure period, delay a turn-on period of each color relative to a sensing period of each color.

16. The ASIC of claim 15, wherein the emission of the first light being delayed occurs during a period which is substantially at the end of the first exposure period, and wherein the emission of the second light being delayed occurs during a period which is substantially in the middle of the second exposure period.

* * * * *